US011804008B2

(12) United States Patent
Fuller

(10) Patent No.: US 11,804,008 B2
(45) Date of Patent: Oct. 31, 2023

(54) SYSTEMS AND METHODS OF TEXTURE SUPER SAMPLING FOR LOW-RATE SHADING

(71) Applicant: Microsoft Technology Licensing, LLC, Redmond, WA (US)

(72) Inventor: Martin Jon Irwin Fuller, Gaydon (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/345,649

(22) Filed: Jun. 11, 2021

(65) Prior Publication Data
US 2022/0245889 A1 Aug. 4, 2022

Related U.S. Application Data

(60) Provisional application No. 63/144,276, filed on Feb. 1, 2021.

(51) Int. Cl.
  *G06T 15/80* (2011.01)
  *A63F 13/52* (2014.01)
  *G06T 1/20* (2006.01)
  *G06T 15/04* (2011.01)

(52) U.S. Cl.
  CPC .............. *G06T 15/80* (2013.01); *A63F 13/52* (2014.09); *G06T 1/20* (2013.01); *G06T 15/04* (2013.01)

(58) Field of Classification Search
  CPC ................................ G06T 15/80; G06T 15/04
  See application file for complete search history.

(56) References Cited

U.S. PATENT DOCUMENTS

| 2004/0001069 | A1* | 1/2004 | Snyder | G06T 15/80 345/582 |
| 2015/0178983 | A1* | 6/2015 | Akenine-Moller | G06T 15/80 345/426 |
| 2017/0263046 | A1* | 9/2017 | Patney | G06T 15/20 |
| 2018/0047203 | A1* | 2/2018 | Grossman | G06T 15/005 |

(Continued)

OTHER PUBLICATIONS

Lake, et al., "Getting Started with Variable Rate Shading on Intel Processor Graphics", Retrieved from: https://web.archive.org/web/20220512001947/https://www.intel.com/content/dam/develop/external/us/en/documents/getting-started-with-vrs-on-intel-processor-graphics.pdf. May 12, 2022, 15 Pages.

(Continued)

*Primary Examiner* — Samantha (Yuehan) Wang
(74) *Attorney, Agent, or Firm* — RAY QUINNEY & NEBEKER P.C.; John O. Carpenter

(57) ABSTRACT

A method of rendering image frames on a computing system includes rendering an initial frame having a plurality of pixels and determining a low-resolution shading rate for at least one object in the frame or at least a portion of the frame based on at least one metric of the initial frame. The method further includes identifying a shading block having a plurality of pixels based on the low-resolution shading rate and sampling a texture data of the surface associated with the shading block wherein a texture sampling rate is at least two. The average of the texture samples is then applied to the pixels associated with the shading block. The method further includes shading the pixels in the shading block and displaying an output frame on a display device.

20 Claims, 6 Drawing Sheets

(56) References Cited

U.S. PATENT DOCUMENTS

2020/0051290 A1    2/2020  Yang et al.

OTHER PUBLICATIONS

"International Search Report and Written opinion Issued in PCT Application No. PCT/US22/012397", dated May 19, 2022, 18 Pages.

Turanszkij, "Variable Rate Shading: First Impressions", Retrieved from: https://web.archive.org/web/20201128185001/https://wickedengine.net/2020/09/06/variable-rate-shading-first-impressions/, Sep. 6, 2020, 12 Pages.

White, et al., "Variable-Rate Shading (VRS)", Retrieved from: https://web.archive.org/web/20201211092026/https://docs.microsoft.com/en-us/windows/win32/direct3d12/vrs, Apr. 8, 2019, 27 Pages.

\* cited by examiner

SYSTEMS AND METHODS OF TEXTURE SUPER SAMPLING FOR LOW-RATE SHADING

CROSS-REFERENCE TO RELATED APPLICATIONS

This application claims priority to and the benefit of U.S. Provisional Patent Application No. 63/144,276, filed on Feb. 1, 2021, which are hereby incorporated by reference in their entireties.

BACKGROUND

Background and Relevant Art

A Graphics Processing Unit (GPU), a central processing unit (CPU), or other computing device renders a set of pictures to be viewed as a video. Each image is conventionally rendered and comprised of individual pixels. Pixel values are derived using one or more shaders to achieve a variety of visual effects including texturing, lighting effects such as reflections and shadows and post processing such as motion blur, depth of field. Shading every pixel in an image can be inefficient for processing resources but lowering the shader resolution can have adverse effects on the texture resolution.

BRIEF SUMMARY

In some implementations, a method of rendering image frames on a computing system includes rendering an initial frame having a plurality of pixels and determining a low-resolution shading rate for at least a portion of the initial frame based on at least one metric of the initial frame. The method further includes identifying a shading block having a plurality of pixels based on the low-resolution shading rate and sampling a texture data of the surface associated with the shading block wherein a texture sampling rate is at least two. The average of the texture samples is then applied to the pixels associated with the shading block. The method further includes shading the pixels in the shading block and displaying an output frame on a display device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
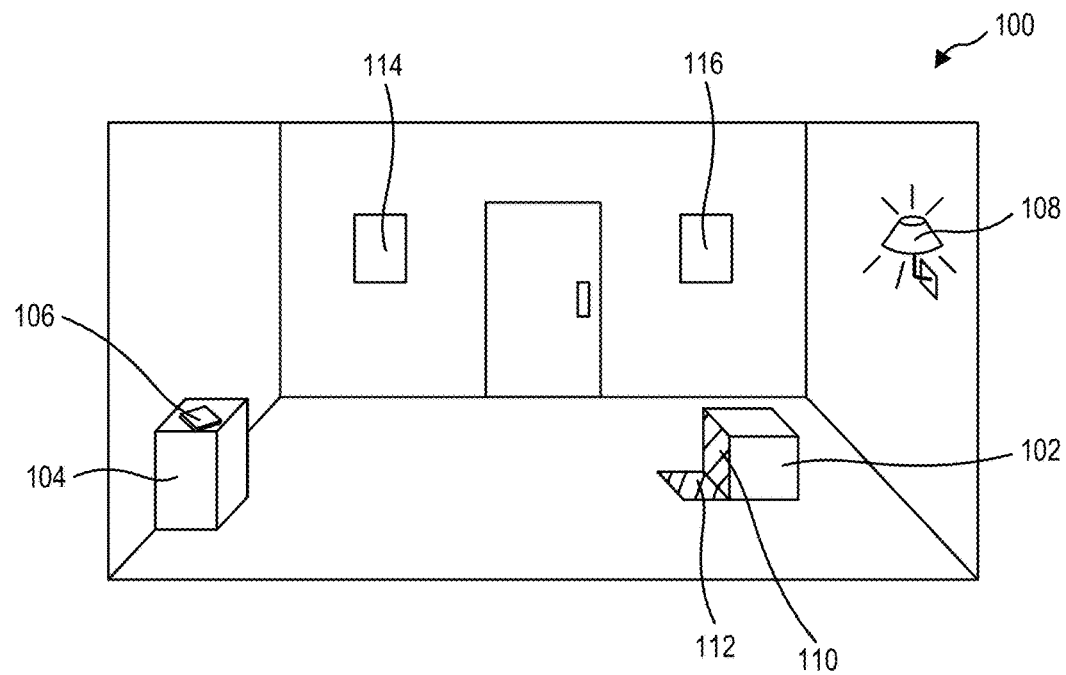
FIG. 1 is a schematic representation of a frame rendered by a computing system, according to at least one implementation of the present disclosure.

The present disclosure relates generally to systems and methods for of texture sampling for low-rate shading in computer-generated images. More particularly, the present disclosure relates to systems and methods of increasing texture fidelity of a pixel shader while lowering the overall processing load of other properties of the pixel shader.

For example, a conventional graphical pipeline for computer-generated images includes a central processing unit (CPU) of a computer sending instructions and geometry data to a graphics processing unit (GPU), on a dedicated graphics card in the computer or with both CPU and GPU combined onto a single System On a Chip (SOC). The geometry data is transformed using a vertex shader to create a primitive graphical object or other base version of the virtual objects in the game environment. In some examples, a geometry shader or tessellation shader of the GPU is then applied to the primitive graphical object to refine the structure of the virtual objects in the game environment. The calculated geometry is then triangulated so a pixel shader can be applied.

Conventionally, the alteration of the virtual objects includes the application of one or more post-processing techniques, anti-aliasing, blur shaders, light bloom, tone mapping, other shaders, or other types of post-processing. For example, a pixel shader may be any specialized program for calculating rendering effects on graphical elements. A pixel shader may be used to perform shading (i.e., the production of desired levels of light, darkness, and color in a displayed image) or may perform any visual alteration to a graphical element. For example, a pixel shader may alter the hue, saturation, brightness or contrast of an image; produce blur, light bloom, volumetric lighting, normal mapping for depth effects, bokeh, cell shading, posterization, bump mapping, distortion, chroma keying (so-called "bluescreen/greenscreen" effects), edge detection or motion detection, and other effects. While flexible, applying pixel shaders is time and resource intensive.

A pixel shader is applied to the pixels of the geometries after the geometries have been converted into a two-dimensional screenspace. The pixel shader adjusts the appearance of the pixels and make the virtual objects in the screenspace appear as the viewer would expect them (e.g., mapping a woodgrain texture to a board) and to form a coherent virtual environment (e.g., shading the board with shadows cast by nearby objects). For this reason, the pixel shaders are a critical part of making the virtual environment look believable to the user.

For example, the pixel shader includes texture information from texture data that is mapped to the surfaces of the geometries. In an example, the hood of a car in a racing game may have a single base color assigned to as the orange paint color of the vehicle and a white racing stripe may be included in the texture data such that a section of the hood. The texture data is mapped to the surface of the hood and the white stripe appears on the surface of the hood. When the vehicle experiences damage in the game, the geometry of the hood may change to reflect the damage (e.g., crumple), and the same texture data will map to the new geometry by pixel coordinates of the new geometry.

Additionally, the pixel shader can adjust the appearance of a pixel based on various lighting effects desired in the scene. For example, orange color of the texture data in the previous example may be lightened to create the appearance of reflecting a light source (e.g., the sun) off the hood of the car. In another example, the orange color of the texture data may be darkened to create the appearance of driving at night. In yet another example, the orange color of the texture data for a door of the car may be changed to simulate a reflection of a green car adjacent the orange car.

In some examples, the pixel shader can further create a visual immersion by simulating the accumulation of dirt on the car during a race or creating the appearance of fog or smoke in front of the car. In some examples, the pixel shader can change the appearance of pixels and/or virtual objects for stylistic purposes, such as de-saturating the colors of pixels based on an impending expiration of a time limit or exhausting a limited resource such as health points.

While the pixel shader(s) are, therefore, critical to the visual presentation of the virtual environment to the viewer, the pixel shaders are typically calculated for each individual pixel in the screenspace. Particularly with increasing resolutions rendered by computers and game consoles, the processing load associated with calculating the pixel shaders on a per-pixel basis is large and ever-growing.

Variable rate shading (VRS) is a technique that uses one or metrics of the of the image or object properties to selectively reduce the shaded resolution in regions of the image that require (or are expected to require) less visual detail. For example, VRS can determine that pixels in a region of the image or in a particular object in the image are substantially similar and apply a coarser shading rate to that region, such as square shading rates including 2×2 pixels, 3×3 pixels, 4×4 pixels, etc.; or non-square shading rates, such as 1×2 pixels, 2×1 pixels, 2×3 pixels, 3×5 pixels, etc. By calculating and applying a single shader for that lower-resolution region of pixels instead of calculating and applying a shader for each pixel individually, VRS can reduce processing loads on the computing system.

FIG. 1 illustrates an implementation of a frame 100 rendered by a computing system that may employ VRS to selectively reduce the shading rate in regions requiring less visual detail. For example, the frame 100 presents a room including a crate 102 and a table 104. The table 104 has a book 106 resting on the surface of the table 104. A light source 108 in the room provides illumination to the room and contrast on the crate 104. The crate 104 is partially illuminated with the non-illuminated portion 110 being darker, as well as the shadow 112 cast by the crate occluding the light from the light source 108. In an implementation where the light source 108 is the only source of light in the room, the non-illuminated portion 110 of the crate 104 and the shadow 112 cast by the crate 104 may be substantially black. In an environment with diffuse lighting, the non-illuminated portion 110 of the crate 104 and the shadow 112 cast by the crate 104 may be partially lit, but still considerably darker than the rest of the room.

VRS can utilize the black value of the non-illuminated portion 110 of the crate 104 and the shadow 112 cast by the crate 104 or the contrast between the non-illuminated portion 110 of the crate 104 and the shadow 112 cast by the crate 104 and the rest of the room to determine that those dark regions can be shaded at a lower shading rate because less visual detail will be visible to the viewer due to the darkness. In another example, VRS can utilize the white value of the light source 108 and/or surrounding pixels or the contrast between the light source 108 and/or surrounding pixels and the rest of the room to determine that the light source 108 and/or surrounding pixels can be shaded at a lower shading rate because less visual detail will be visible to the viewer due to being washed out by the brightness.

In some examples, VRS can examine the previous frame generated by the computing system for high frequency data. For example, VRS may use an edge detection model to determine features in the virtual environment which should be preserved and conversely determine regions where shading rate may be reduced. VRS can examine the entire frame or portions of the frame to apply the variable shading rate. Alternatively, the variable shading rate may be calculated for and/or applied on a per-object basis, such as for objects far away, near the edge of the screen, or behind semi-transparent or translucent surfaces including the surface of a water feature or through windows. In some implementations, the VRS may be selectively applied to particle effects, as well, such as only to particle effects or the particle effects may have different threshold settings for VRS (e.g., distance from the viewer, or distance to the edge of the screen) than the rest of the virtual environment.

The frame 100 shown in FIG. 1 further includes objects at varying depths to the viewer. For example, the crate 102 is positioned in the virtual environment nearer the viewer than the door 114 or objects out the windows 116. If depth of field is applied to blur objects in the far distance, the objects in the windows 116 may be shaded at a lower shading rate than the crate 102, as the details of the objects in the windows 116 will be less apparent to the viewer. In contrast, while the door 114 is farther from the viewer than the crate 102, the door is centered in the frame 100. In some examples, objects in the center of the frame 100 may be of greater interest to the viewer and/or be the object at which the application has chosen to direct the focal distance. The VRS can, therefore, assume the viewer's attention will be directed to the objects at or near the center of the frame 100 and shade the objects at or near the center of the frame 100 at a higher shading rate (e.g., a 1×1 shading rate) to produce the greatest visual fidelity in those areas. In another example, the VRS assume the viewer's attention will be directed to the objects at or near a cursor or reticle, if a cursor or reticle is used in the environment.

Figure 2:
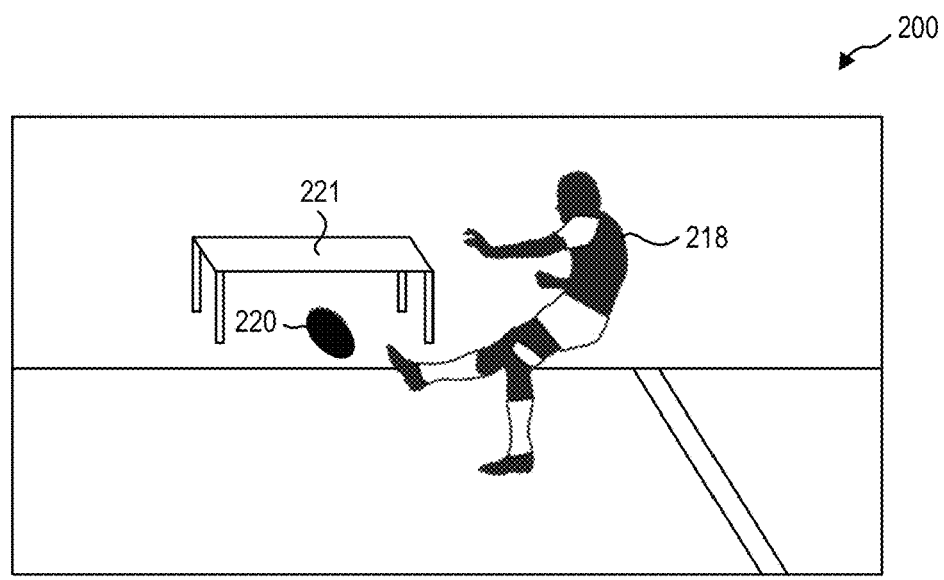
FIG. 2 is a schematic representation of another frame rendered by a computing system depicting moving objects, according to at least one implementation of the present disclosure.

FIG. 2 illustrates another example frame 200 in which objects are depicted in motion by a sequence of frames rendered by the computing device. The frame 200 is one of a plurality of frames in a sequence to simulate a rugby winger kicking to touch. The avatar 218 of the winger and the ball 220 are simulating in motion in the frame(s) 200. The VRS may use the relative motion of objects relative to the virtual environment to determine which objects to shade at a higher or lower shading rate. For example, the viewer's attention will likely be drawn to the ball 220 in motion and not at the table 221 located off the pitch. As such, the pixels of the table 221 may be shaded with a lower shading rate than the ball 220.

Figure 3:
FIG. 3 illustrates a motion vector field calculated by differences between two sequential frames, according to at least one implementation of the present disclosure.
Figure 3:
Figure 3:
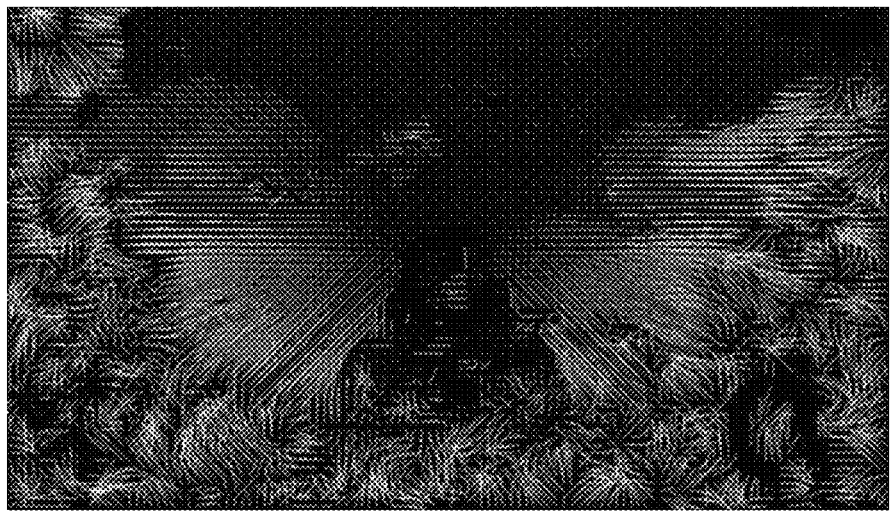

In some implementations, VRS can shade different objects or regions differently based on relative movement between frames in a sequence of frames, and the VRS may apply different shaders at different rates. FIG. 3 illustrates an example motion vector field calculated from a first frame 300-1 and a second frame 300-2. In some implementations, the surrounding environment of the vehicle while moving may exhibit a high degree of movement while objects further toward the horizon or in the sky exhibit relatively little or no motion. In some implementations, a blur shader is only applied to regions, objects, blocks, or pixels of the frame when the motion vector has a magnitude above a threshold value. For example, the sky of the frames shows little to no movement. In some implementations, the computing system only applies a blur shader to the road, vehicle, and surrounding objects and does not apply the blur shader to the sky, reducing the computational demands.

In some implementations, a threshold value for the blur shader is a percentage of the maximum calculated vector magnitude in a motion vector field 323. For example, the computing system may apply the blur shader to only regions, objects, blocks, or pixels that exhibit at least 2% of the maximum calculated vector magnitude of the refined first resolution motion vector field. In some implementations, the computing system may apply the blur shader to only regions, objects, blocks, or pixels that exhibit at least 5% of the maximum calculated vector magnitude. In some implementations, the computing system may apply the blur shader to only regions, objects, blocks, or pixels that exhibit at least 10% of the maximum calculated vector magnitude. Because those regions, objects, blocks, or pixels show relatively little speed of movement, the viewer expects those regions, objects, blocks, or pixels to exhibit less blur, and therefore, the system can save resources by not applying the blur shader without the user perceiving unexpected visuals.

However, while the regions in the sky exhibit little motion and do not require a blur shader, the sky may be of sufficient white level to allow the clouds to be shaded at a lower second shading rate for other pixel shader effects. For example, the volumetric lighting of the clouds can be shaded at a lower rate due to the diffuse nature of clouds with a low level of per pixel variance.

While the present disclosure describes VRS calculated based on the current frame, objects in the current frame, or comparisons or calculations based on prior frames and based on a variety of metrics including white level, black level, contrast, distance, edge detection, high frequency data, relative motion, motion vector fields, transparencies, occlusion, etc., it should be understood that these examples are illustrative and not exhaustive. Other methods of calculating the VRS regions are contemplated.

Figure 4:
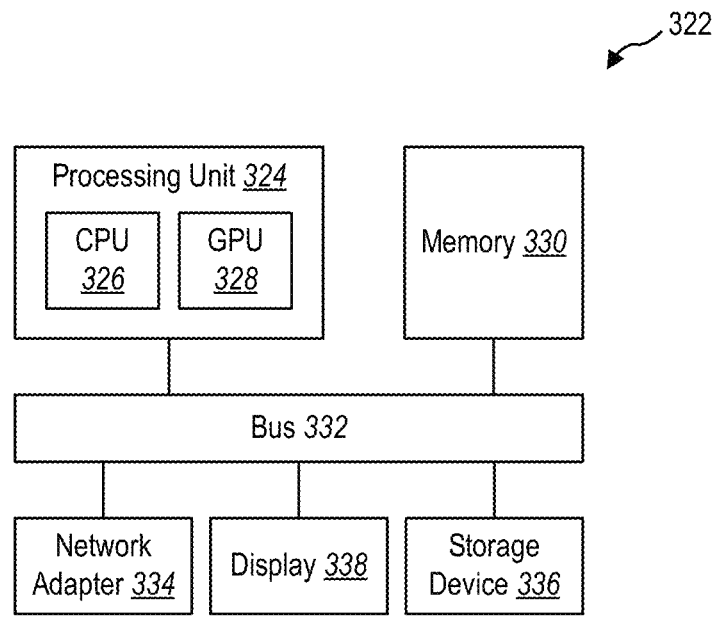
FIG. 4 is a schematic representation of a computing system, according to at least one implementation of the present disclosure.

FIG. 4 illustrates an implementation of a computing system 322, according to the present disclosure. In some implementations, the computing system 322 may be a self-contained computing system that is contained within a housing, such as desktop tower or a laptop body. In other implementations, the computing system of the computing system 322 may be a distributed system having one or more components described herein located remotely. In at least another example, at least a portion of the computing system may be accessible through a network or the internet, such as including access to cloud computing to supplement the graphical processing of the computing system or cloud storage to supplement the data storage of the computing system 322. In various implementations, at least a portion of the computing system 322 may include a server computer, a client computer, a personal computer (PC) (e.g., a laptop or desktop computer), a mobile smart phone, a tablet computer, another wearable computer, a gaming console, or any machine capable of executing a set of instructions (sequential or otherwise) that specify actions to be taken by a computer system.

In some implementations, the computing system 322 may include a processing unit 324, memory unit 330, a bus 332 that allows communication between computing system components, a network adapter 334, a hardware storage device 336, and additional input, output, and display devices 338, or combinations thereof. In some implementations, the processing unit 324 may include a central processing unit (CPU) 326 and a graphics processing unit (GPU) 328. Note that the CPU 326 and GPU 328 are show in FIG. 4 as discrete components for illustrative purposes. However, in some implementations, one or more aspects of the described CPU 326 and GPU 328 may be integrated into a single processing unit 324.

While the memory unit 330 (i.e., volatile memory and/or non-volatile memory) and storage device 336 (sometimes individually or collectively referred to as "machine-readable medium") are each shown to be a single medium, the term "machine-readable medium" and "storage medium" should be taken to include a single medium or multiple media (e.g., a centralized or distributed database, and/or associated caches and servers) that store one or more sets of instructions, scripts, or data. The term "machine-readable medium" and "storage medium" shall also be taken to include any medium that is capable of storing, encoding, or carrying a set of instructions for execution by the computing system and that cause the computing system to perform any one or more of the techniques of the presently disclosed implementations.

In general, the routines executed to implement the implementations of the disclosure, may be implemented as part of an operating system or a specific application, component, program, object, module, or sequence of instructions referred to as "computer programs." The computer programs typically comprise one or more instructions set at various times in various memory and storage devices in the computing system 322, and that, when read and executed by one or more processing units 324 or processors (e.g., CPU 326 or GPU 328), cause the computing system of the computing system 322 to perform operations to execute elements involving the various aspects of the disclosure.

Moreover, while implementations have been described in the context of fully functioning computers and computer systems, those skilled in the art will appreciate that the various implementations are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices, floppy and other removable disks, hard disk drives, optical disks (e.g., Compact Disk Read-Only Memory (CD-ROM), Digital Versatile Disks (DVDs), BLU-RAY disks), and transmission type media such as digital and analog communication links.

The network adapter 334 may enable the computing system and/or computing system 322 to mediate data in a network with an entity that is external to the HMD, through any known and/or convenient communications protocol supported by the computing system of the computing system 322 and the external entity. The network adapter 334 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

Components of the computing system 322 may be used in graphics processing. For example, the computing system 322 may use a graphics pipeline that processes one or more shaders for rendering a graphics element. A graphics processing pipeline may include a series of operations, which may be specified by shaders that are performed during procedural generation of graphical elements. These pipelines are generally designed to allow efficient processing of digital graphics, while taking advantage of available hardware.

In general, a GPU 328 is a processing unit that facilitates graphics rendering. The GPU 328 can be used to process vast amounts of data-parallel computations efficiently. The GPU 328 can be used to render any visual output including images, animations, text, and/or video for display to a user via the display 338. In some implementations, a GPU 328 can be located, for example, on selectively removable and/or replaceable cards, in a chipset on the motherboard, or integrated into the same chip as the CPU 326. In an implementation, a GPU 328 (e.g., on a video card) can include hardware memory or access hardware memory. In some implementations, a memory unit(s) 330 that functions as both system memory (e.g., used by the CPU 326) and video memory (e.g., used by the GPU 328) can be employed. In other implementations, a memory unit 330 that functions as system memory (e.g., used by the CPU 326) may be separate from a memory unit 330 that functions as video memory (e.g., used by the GPU 328). As can be appreciated, in some implementations, the functionality of the GPU 328 may be emulated in software, for example, executed by the CPU 326 with an associated increase in processing time, as the CPU 326 is tasked with additional computations.

Figure 5:
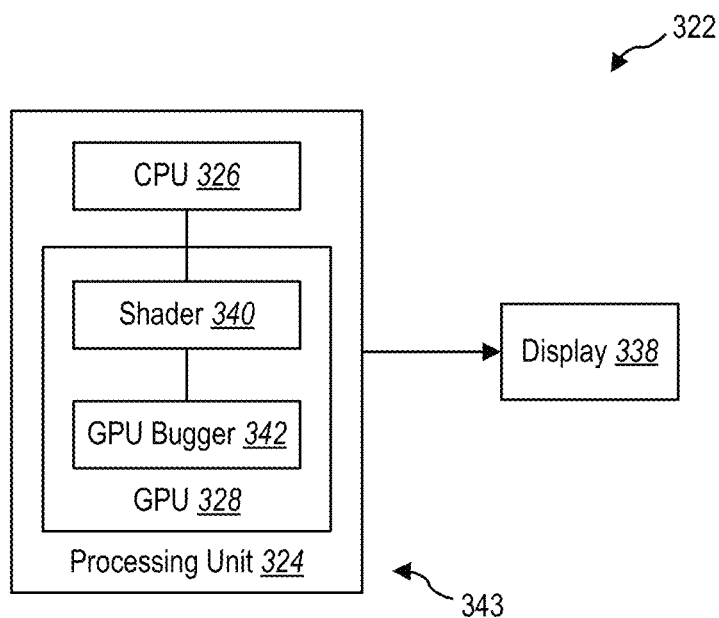
FIG. 5 is a schematic representation of computing architecture, according to at least one implementation of the present disclosure.

FIG. 5 is a system diagram illustrating an implementation of a computing architecture 343 of a computing system 322 according to the present disclosure. In some implementations, the computing architecture 343 may include the processing unit 324 performing a set of instructions in the CPU 326 and GPU 328 and displaying visual information to a user on a display 338.

The instructions performed by the processing unit 324 may include at least one shader 340. Examples of shaders include vertex shaders, pixel shaders, and geometry shaders. Vertex shaders generally operate on vertices, and can apply computations of positions, colors, and texturing coordinates to individual vertices. For example, a vertex shader may perform either fixed or programmable function computations on streams of vertices specified in the memory of the graphics pipeline. Another example of a shader is a pixel shader. The outputs of a vertex shader can be passed to a pixel shader, which in turn may be interpolated to generate information corresponding to an individual pixel. Yet another type of shader includes a geometry shader. A geometry shader, which is typically executed after vertex shaders, can be used to generate new graphics primitives, such as points, lines, and triangles, from those primitives that were sent to the beginning of the graphics pipeline.

Operations performed by a shader 340 may use one or more external graphics-specific resources. These resources can include a constant buffer (cbuffer), texture, unordered-access-view (UAV), or sampler (sampler states), for example. Resources may be assigned positions in graphics pipeline memory which are bound prior to execution by the GPU 328, and are typically bound at compilation time or runtime. However, as described below, implementations of the present invention assign virtual positions to those resources during compilation. Then, at a later time such as a "link-time," which may occur at runtime, once a structure of the shader is determined, the assigned virtual resource positions are remapped to the appropriate physical or actual positions of the resources.

After a shader 340 concludes its operations, the information may be placed in a GPU buffer 342. The information may be presented on an attached display 338 or may be sent back to the host for further operations.

The GPU buffer 342 provides a storage location on the GPU 328 where information, such as image, application, or other resources information, may be stored. As various processing operations are performed with respect to resources, the resources may be accessed from the GPU buffer 342, altered, and then re-stored on the buffer 342. The GPU buffer 342 allows the resources being processed to remain on the GPU 328 while it is transformed by a graphics or compute pipeline. As it is time and energy consuming to transfer resources from the GPU 328 to a memory unit (such as memory unit 330 described in relation to FIG. 4, it may be preferable for resources to remain on the GPU buffer 342 until processing operations are completed.

GPU buffer 342 also provides a location on the GPU 328 where graphics specific resources may be positioned. For example, a resource may be specified as having a certain-sized block of memory with a particular format (such as pixel format) and having specific parameters. In order for a shader 340 to use the resource, it may bound to a "slot" in the graphics pipeline. By way of analogy and not limitation, a slot may be considered like a handle for accessing a particular resource in memory. Thus, memory from the slot can be accessed by specifying a slot number and a location within that resource. A given shader 340 may be able to access only a limited number of slots (e.g., 32).

Figure 6:
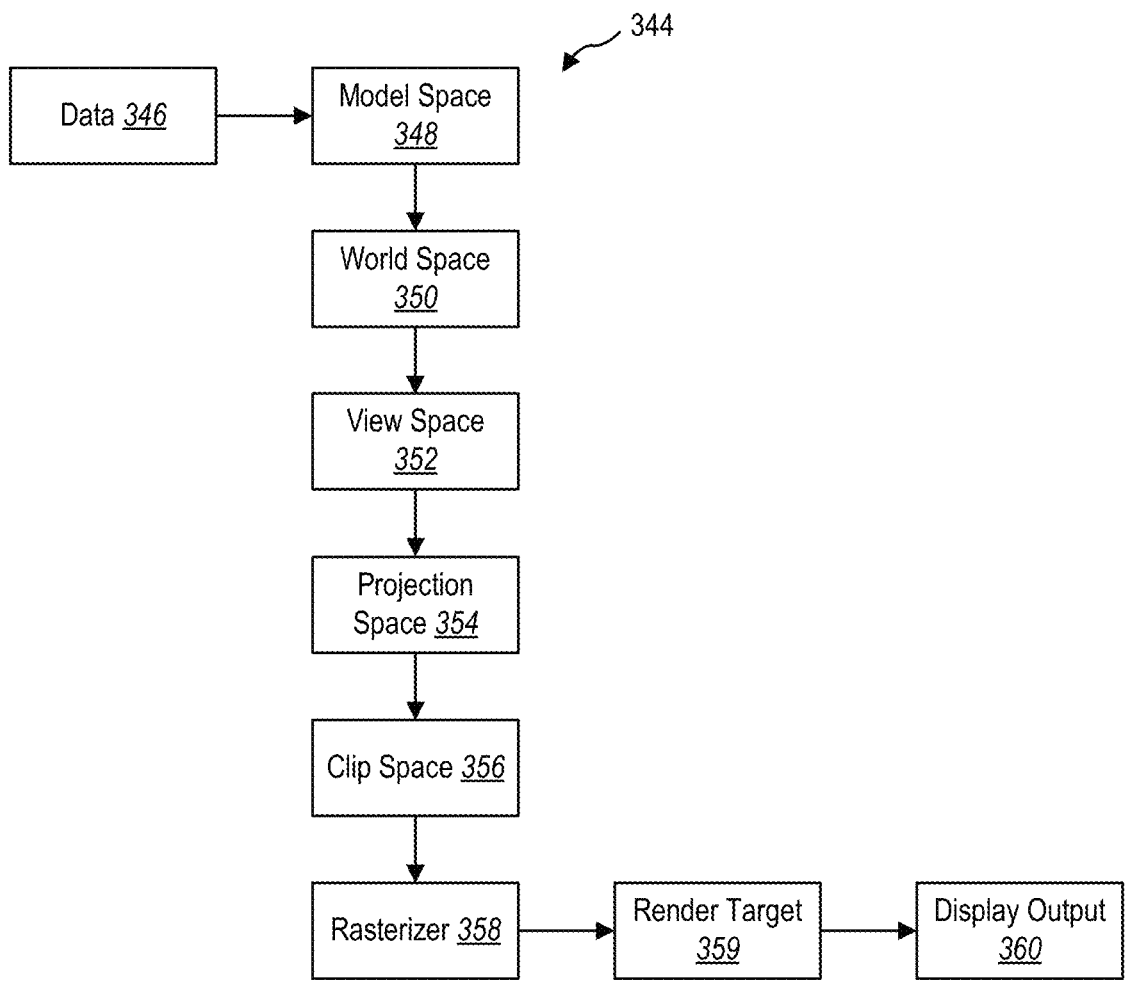
FIG. 6 is a schematic representation of graphical pipeline used by a computing system, according to at least one implementation of the present disclosure.

FIG. 6 is a flowchart of an implementation of a graphics pipeline 344 of a computing system 322 according to the present disclosure, for example, for rendering images of graphical objects existing in a 3D world space. The graphics pipeline 344 may be used to, for example, render an image of the object for display, via a display device (e.g., display 338 of FIG. 5), to a user. In some implementations, the graphics pipeline 344 may be used to determine the pixel or pixels to be shaded that may be displayed via the display. The graphics pipeline 344 may be mapped onto any combination of graphics hardware and/or software, for example, the GPU 328 described above with respect to FIG. 4.

The graphics pipeline 344 may include hardware components such as servers, controllers, databases, processors, storage drives, registers, cache, RAM memory chips, data buses, or the like and/or software components such as graphics rendering applications (e.g., including rendering engines, libraries, shader programs, etc.).

According to one implementation, the graphics pipeline 344 may convert a 3D model or scene received from a processor into the 2D output that may be displayed via a display device. For example, the graphics pipeline 344 may receive input data 346 including, for example, a graphical model. The input data 346 may include primitive objects, which may include mathematical polygons such as triangles, quadrilaterals, or the like that may be modeled in a modeled scene such as a model space 348. Primitive objects may include or be defined by a multiple vertices representative of the corners of the primitive object and multiple edges representative of the sides of the primitive object. For example, a primitive object in the form of a quadrilateral (or "quad") would include at least four vertices and at least four edges connecting the four vertices. In some implementations, the quad may be split into two triangles by a bisecting edge connecting opposing vertices.

In an example implementation, a coordinate system may be established such that primitives may be properly situated in the 3D model space 348. The model space 348 may be converted into a 3D world space 350, a view space 352, and a projection space 354. It may be converted in discrete individual stages, a single stage resulting from a concatenation of matrix transforms, or any combination thereof.

The graphical pipeline 344 may clip and process primitives expressed in projection space 354 from transformation after the primitives have been transformed from view space 352, and after primitives in projection space are transformed to clip space 356. The graphical pipeline 344 may provide the clipped and processed contents of the 3D scene from the clipping unit into the rasterizer 358. According to one implementation, the transformed projected view may be established by, for example, placing a virtual "camera" in the 3D world space 350. In one implementation, the virtual camera may be positioned based on a location of, for example, a user that may view the 2D output via a display device. Based on the positioning of the virtual camera, a coordinate system may be established for view space 352 and projection space 354.

The graphical pipeline 344 may further rasterize the clipped scene. For example, the graphical pipeline 344 may include a rasterizer 358. According to an example implementation, the rasterizer 358 may render primitives associated with the clipped data from clip space 356 into pixels that may form a display output 360 that is then output via a display. For example, the clipped data from clip space 356 may be divided into a two-dimensional array of pixels. The rasterizer 358 may then render the primitives into render targets 359 that may form a display output 360. In some implementations, the generation of the pixels may be performed by a pixel shader that is part of or operating in conjunction with the rasterizer 358. The rendered image of the primitive may then be output as a display output 360 to a display device.

It is in the pixel shader(s) that the VRS techniques described herein can reduce processing loads by selectively reducing the shading rate to invoke the pixel shader once but copy the results to multiple pixels within a designated region. However, because the pixel shader is also responsible for texture mapping of texture data to the pixels, reducing the shading rate may undesirably reduce the texture resolution, as well.

Figure 7:
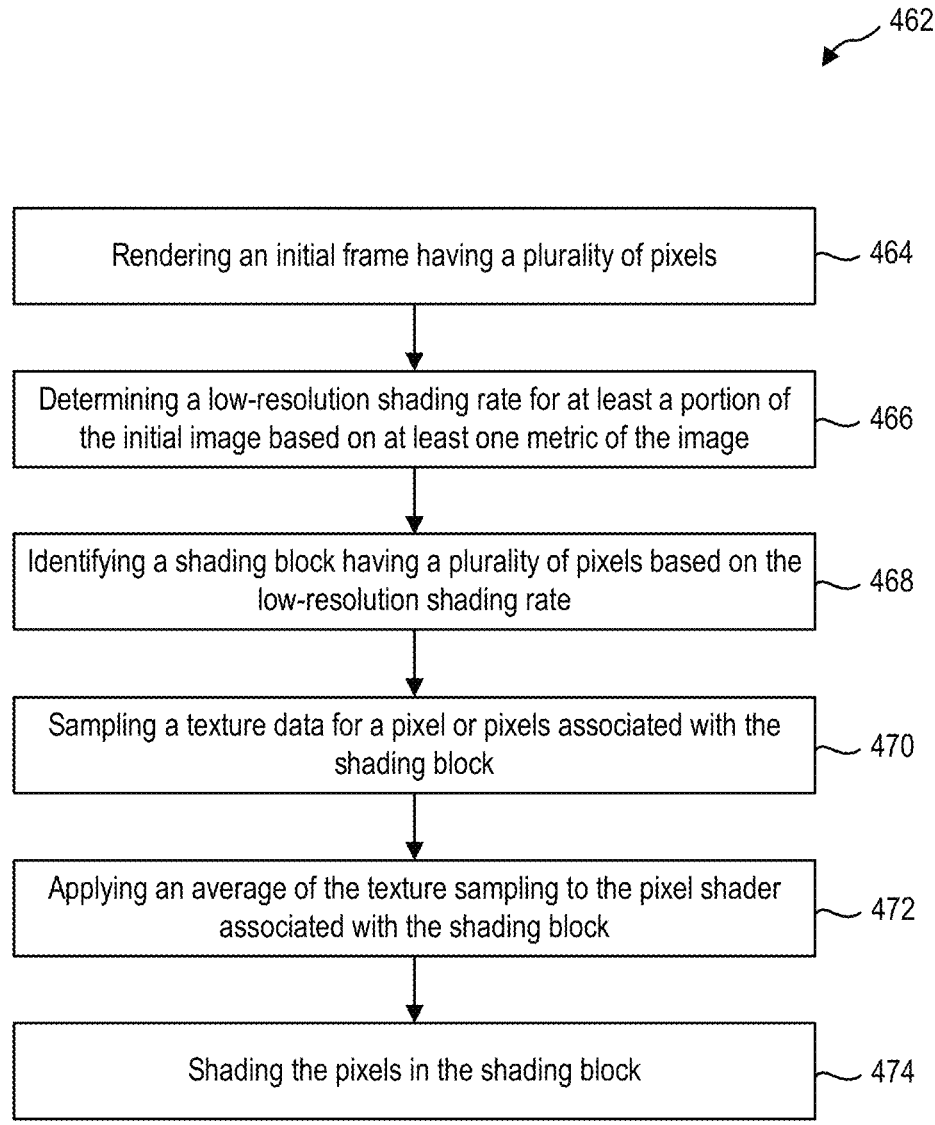
FIG. 7 is a flowchart of a method of rendering a frame with a computing system, according to at least one implementation of the present disclosure.

Referring now to FIG. 7, in some implementations, a method 462 according to the present disclosure allows for texture sampling at a higher rate when a low-resolution shading rate is used. The method 462 includes rendering an initial image having a plurality of pixels at 464 and determining a low-resolution shading rate for at least a portion of the initial image based on at least one metric of the image at 466. It should be understood that the term initial frame, as used herein, describes the frame data prior to pixel shading, and not necessarily the first frame in a sequence or a video. The initial frame refers only to the data to which the pixel shader is applied. In some implementations, the low-resolution shading rate is any shading rate less than 1×1, for example, 1×2, 2×1, 2×2, 2×3, 3×5, etc. The portion of the image may be determined based on the methods described in relation to FIG. 1 through FIG. 3 or other metrics.

A shading block is identified, where the shading block is a plurality of pixels based on the low-resolution shading rate at 468. For example, if the low-resolution shading rate of the VRS is 2×2, the shading block is a 2×2 pixel region of the image. In some implementations, a plurality of portions of the image are determined with different shading rates. In such implementations, the shading blocks are different for the different portions and the shading blocks are equal to the shading rates of the respective portions of the image.

The method 462 further includes sampling a texture data for a pixel or pixels associated with the shading block at 470. In some implementations, sampling the texture data includes sampling the texture data with a texture sampling rate of at least 2. For example, the texture data is sampled twice per shading block based on the low-resolution shading rate. In another example, the texture data is sampled 3 times per shading block. In some implementations, the texture sampling rate is equal to the pixel area of the shading block. For example, a 1×2 shading block has a 2-pixel area, and the texture sampling rate is 2. In another example, a 2×2 shading block has a 4-pixel area, and the texture sampling rate is 2, 3 or 4. In some implementations, the texture sampling rate is greater than the pixel area. For example, a 1×2 shading block has a 2-pixel area, and the texture sampling rate is 3 or more. In another example, a 2×2 shading block has a 4-pixel area, and the texture sampling rate is 5 or more.

In some implementations, the texture sampling rate is greater than 1 and no more than the pixel area of the shading block. For example, a shading block that is 2×4 may have a texture sampling rate of between 2 and 8. In another example, a shading block that is 1×2 has a texture sampling rate of 2. In yet another example, a shading block that is 3×3 has a texture sampling rate of between 2 and 9.

In at least implementation, the texture sampling rate may be based at least partially upon a distance between the viewer and the surface associated with the shading block. For example, a first shading block of a 2×2 VRS portion of the frame may be closer than a second shading block of the 2×2 VRS portion of the frame. The first shading block may be shaded with a higher texture sampling rate than the second shading block, as a viewer would expect less detail to be visible at distance. Scaling the texture sampling rate based at least partially upon distance from the viewer may further reduce processing load of the pixel shader(s). In another example, the texture sampling rate may be based at least partially upon the distance between the shading block and the edges of the display output, so shading rate blocks at the periphery of the observer's vision may receive less texture sampling rate.

The method 462 continues by applying an average of the texture sampling to the pixel shader associated with the shading block at 472 and shading the pixels in the shading block at 474. By supersampling the texture data for each low-resolution shading block, the texture resolution of the output image after pixel shading may retain a higher visual fidelity while requiring less processing load to calculate and apply other pixel shading effects, such as lighting effects.

Figure 8:
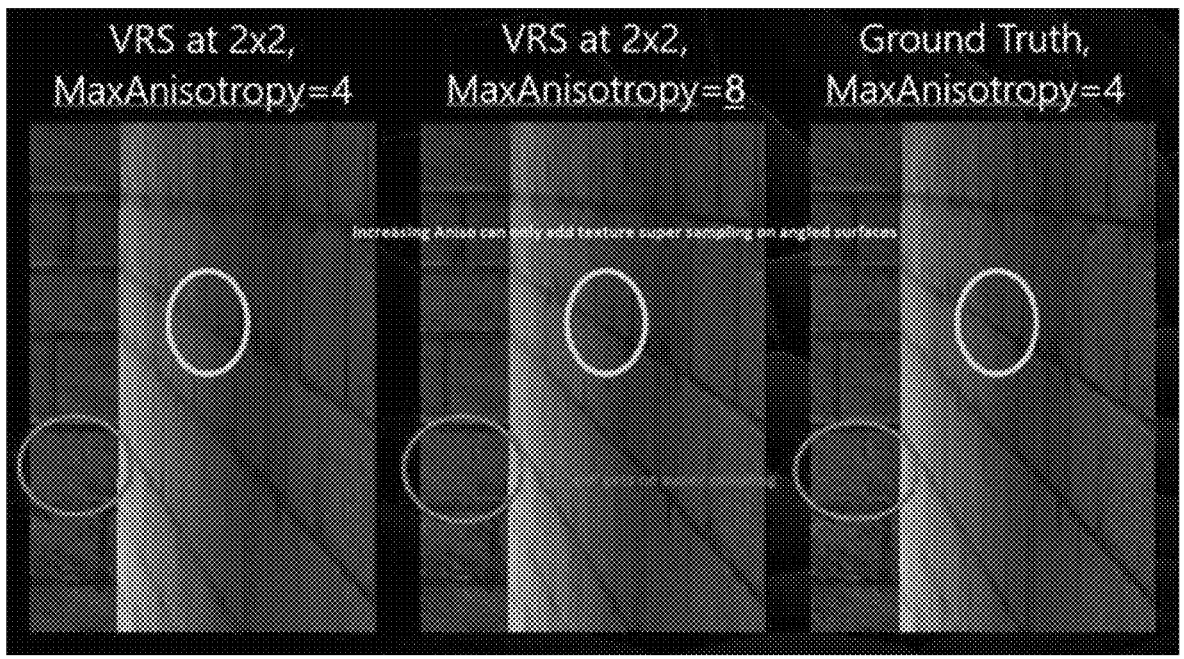
FIG. 8 is an example application of texture supersampling for low shading rates, according to at least one implementation of the present disclosure.

FIG. 8 is an example of texture supersampling based on the orientation of the surface being rendered relative to the viewer. Anisotropic filtering is used to supersample the texture data when the surface being shaded is positioned at an oblique angle to the viewer. As shown in FIG. 8, increasing the number of anisotropic texture filtering samples increases the resolution of the textures on the angled surface to better approximate the ground truth texturing, even when a low-resolution shading rate (e.g., VRS at 2×2) is used. However, conventional anisotropic filtering provides no benefit for surfaces normal to (or not oblique to) the viewer, as can be seen in the center image. In some implementations, the texture sampling rate of the present disclosure is further increased based upon the orientation of the surface relative to the viewer.

In some implementations, methods and systems according to the present disclosure can reduce processing load for resource intensive pixel shading effects, such as ray traced lighting or transparency by calculating and applying the pixel shaders with a lower resolution in some portions of the frame while retaining texture fidelity. In at least one implementation, low shading rates may be less apparent with higher texture fidelity, allowing developers and software applications to be more aggressive in lowering the shading rate to improve performance.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of improving computer generated video information, the method comprising:
   rendering an initial frame having a plurality of pixels;
   determining a low-resolution shading rate with a value no more than 1.0 for at least a portion of the initial frame based on at least one metric of the initial frame;
   identifying a shading block having a plurality of pixels based on the low-resolution shading rate;
   sampling texture data associated with the shading block of the initial frame wherein a texture sampling rate is greater than a quantity of the pixels in the shading block and different from the low-resolution shader rate; and
   applying an average of texture samplings to the pixels associated with the shading block;
   shading the pixels in the shading block; and
   displaying an output frame on a display device.

2. The method of claim 1, wherein the texture sampling rate is based at least partially upon an orientation of a surface associated with the shading block.

3. The method of claim 1, wherein the texture sampling rate is equal to an anisotropic texture sampling rate of a shaded surface based on surface viewing angle, further increased by the texture sampling rate of the shading block.

4. The method of claim 1, wherein determining a low-resolution shading rate for at least a portion of the initial frame based on at least one metric of the initial frame is based at least partially upon white level or black level of the pixels.

5. The method of claim 1, wherein determining a low-resolution shading rate for at least a portion of the initial frame based on at least one metric of the initial frame is based at least partially upon detecting high frequency data in a previous frame.

6. The method of claim 1, wherein determining a low-resolution shading rate for at least a portion of the initial frame based on at least one metric of the initial frame is based at least partially upon distance of the pixels from the viewer.

7. The method of claim 1, wherein determining a low-resolution shading rate for at least a portion of the initial frame based on at least one metric of the initial frame is based at least partially upon the proximity of the shading block to a center of the frame.

8. The method of claim 1, wherein determining a low-resolution shading rate for at least a portion of the initial frame based on at least one metric of the initial frame is based at least partially upon calculating a motion vector field for the initial frame.

9. The method of claim 1, wherein determining a low-resolution shading rate for at least a portion of the initial frame based on at least one metric of the initial frame is based at least partially upon a rate of motion of a pixel associated with the shading block.

10. The method of claim 1, wherein the texture sampling rate is based at least partially upon a distance between a surface associated with the shading block and a viewer of the initial frame.

11. A computing system for rendering image frames for display to a user, the system comprising:
   a processing unit;
   a memory having texture data stored thereon,
   a display device in communication with the processing unit; and
   a hardware storage device having instructions stored thereon that, when executed by the processing unit, cause the system to:
      render an initial frame having a plurality of pixels;
      determine a low-resolution shading rate with a value no more than 1.0 for at least a portion of the initial frame based on at least one metric of the initial frame;
      identify a shading block having a plurality of pixels based on the low-resolution shading rate;
      sample texture data associated with the shading block of the initial frame wherein a texture sampling rate is greater than a quantity of the pixels in the shading block and different from the low-resolution shader rate; and
      apply an average of texture samplings to the pixels associated with the shading block;
      shade the pixels in the shading block; and
      display an output frame on the display device.

12. The system of claim 11, wherein the processing unit is a graphical processing unit (GPU).

13. The system of claim 11, wherein the texture sampling rate is based at least partially upon an orientation of a surface associated with the shading block.

14. The system of claim 11, wherein the texture sampling rate is equal to an anisotropic texture sampling rate of a shaded surface based on surface viewing angle, further increased by the texture sampling rate of the shading block.

15. The system of claim 11, wherein the instructions further cause the system to determine the low-resolution shading rate for at least a portion of the initial frame based on at least one metric of the initial frame is based at least partially upon white level or black level of the pixels.

16. The system of claim 11, wherein the instructions further cause the system to determine the low-resolution shading rate for at least a portion of the initial frame based on at least one metric of the initial frame is based at least partially upon calculating a motion vector field for the initial frame.

17. A non-transitory computer readable medium having instruction stored thereon that, when executing by a processor, cause the processor to:
   render an initial frame having a plurality of pixels;
   determine a low-resolution shading rate with a value no more than 1.0 for at least a portion of the initial frame based on at least one metric of the initial frame;
   identify a shading block having a plurality of pixels based on the low-resolution shading rate;
   sample texture data associated with the shading block of the initial frame wherein a texture sampling rate is greater than a quantity of the pixels in the shading block and different from the low-resolution shader rate; and
   apply an average of texture samplings to the pixels associated with the shading block;
   shade the pixels in the shading block; and
   display an output frame on a display device.

18. The non-transitory computer readable medium of claim 17, wherein the texture sampling rate is equal to an anisotropic texture sampling rate of a shaded surface based on surface viewing angle, further increased by the texture sampling rate of the shading block.

19. The non-transitory computer readable medium of claim 17, wherein the instructions further cause the system to determine the low-resolution shading rate for at least a portion of the initial frame based on at least one metric of the initial frame is based at least partially upon white level or black level of the pixels.

20. The non-transitory computer readable medium of claim 17, wherein the instructions further cause the system to determine the low-resolution shading rate for at least a portion of the initial frame based on at least one metric of the initial frame is based at least partially upon calculating a motion vector field for the initial frame.

* * * * *